US011268372B2

(12) United States Patent
Calleri

(10) Patent No.: US 11,268,372 B2
(45) Date of Patent: Mar. 8, 2022

(54) METHOD AND APPARATUS FOR DETERMINING THE PERMEABILITY OF A FRACTURE IN A HYDROCARBON RESERVOIR

(71) Applicant: GEOLOG S.R.L., San Giuliano Milanese (IT)

(72) Inventor: Antonio Calleri, Milan (IT)

(73) Assignee: Geolog S.R.L., San Giuliano Milanese (IT)

( * ) Notice: Subject to any disclaimer, the term of this patent is extended or adjusted under 35 U.S.C. 154(b) by 767 days.

(21) Appl. No.: 15/887,597

(22) Filed: Feb. 2, 2018

(65) Prior Publication Data
US 2018/0216454 A1 Aug. 2, 2018

(30) Foreign Application Priority Data

Feb. 2, 2017 (IT) .......................... 102017000011264

(51) Int. Cl.
E21B 47/06 (2012.01)
G01F 1/74 (2006.01)
(Continued)

(52) U.S. Cl.
CPC .............. E21B 47/06 (2013.01); E21B 21/08 (2013.01); E21B 49/00 (2013.01); E21B 49/008 (2013.01);
(Continued)

(58) Field of Classification Search
CPC .......... E21B 47/06; E21B 49/00; E21B 21/08; E21B 49/008; E21B 21/085; E21B 21/00; G01F 1/74; G01F 1/86
See application file for complete search history.

(56) References Cited

U.S. PATENT DOCUMENTS

2012/0232859 A1* 9/2012 Pomerantz ............. G01V 1/282
703/2
2017/0260855 A1* 9/2017 Yang ..................... E21B 49/005

FOREIGN PATENT DOCUMENTS

WO 2008/106544 A2 9/2008

OTHER PUBLICATIONS

Bahrami, Hassan et al., "Characterizing natural fractures productivity in tight gas reservoirs," Journal Petrol Explor Prod Technol 2: pp. 107-115 (Year: 2012).*

(Continued)

Primary Examiner — Steven W Crabb
(74) Attorney, Agent, or Firm — Workman Nydegger

(57) ABSTRACT

A method for determining the permeability of a fractured zone in the subsoil, wherein at least one well is being drilled and at least said fractured zone is encountered, includes: detecting at least one value of a characteristic quantity associated with said well; retrieving from a memory a mathematical model descriptive of said characteristic quantity and dependent on at least the permeability of said fractured zone; activating a processor for: obtaining at least one calculated value of said characteristic quantity by means of said mathematical model; comparing said calculated value with said detected value; calculating a permeability value of said fractured zone as a function of said comparison; generating an output signal representative of said permeability value. Also described is an apparatus for determining the permeability of a fractured zone in the subsoil.

13 Claims, 3 Drawing Sheets

(51) Int. Cl.
    E21B 21/08      (2006.01)
    E21B 49/00      (2006.01)
    G01F 1/86       (2006.01)
(52) U.S. Cl.
    CPC .............. *G01F 1/74* (2013.01); *G01F 1/86* (2013.01); *E21B 21/085* (2020.05)

(56) References Cited

OTHER PUBLICATIONS

Jalal Dashti, et al., "Use of Advanced Mud Gas Chromatography for Reservoir Quality Prediction While Drilling," International Petroleum Technology Conference IPTC-18624-MS pp. 1-15 (Year: 2016).*

Samael Fontenla Alvarez et al., *Evaluation of a Fractured Tight Reservoir in Real-Time: The Importance of Detecting Open Fractures while Drilling with Accurate Mud Flow Measurement*, Search and Discovery Article #41632, Jun. 29, 2015, pp. 13.

Serhat Akin, *Estimating Natural-Fracture Permeability from Mud-Loss Data*, Proceedings, Thirty-Eighth Workshop on Geothermal Reservoir Engineering, Feb. 11-13, 2013, pp. 5.

T. Al-Adwani et al., *Real Time Advanced Surface Flow Analysis for Detection of Open Fractures (SPE 154927)*, 74th EAGE Conference & Exhibition Incorporating SPE EUROPEC 2012, Jun. 4-7, 2012, pp. 6.

G. Beda et al., *Use of Mud Microloss Analysis While Drilling to Improve the Formation Evaluation in Fractured Reservoir*, SPE 71737, SPE International Society of Petroleum Engineers, 2001, pp. 13.

* cited by examiner

METHOD AND APPARATUS FOR DETERMINING THE PERMEABILITY OF A FRACTURE IN A HYDROCARBON RESERVOIR

CROSS-REFERENCE TO RELATED APPLICATIONS

This application claims priority to Italian Application No. 102017000011264, filed Feb. 2, 2017, which is incorporated herein by specific reference.

BACKGROUND OF THE INVENTION

1. The Field of the Invention

The present invention relates to a method and an apparatus for characterizing a fractured zone in the subsoil, and in particular for determining the permeability of said fractured zone in a hydrocarbon reservoir.

2. The Relevant Technology

As is known, hydrocarbon fields are accumulation fields of hydrocarbons contained in formations of porous or fractured rocks. Hydrocarbons are trapped into such formations by other geologic formations or configurations having less permeability, and the zone inside of which hydrocarbons are contained is usually referred to as "reservoir".

In the reservoir, one or more fractures may develop. A fracture is meant to be a crevice or break in the rock that constitutes the field, which has not been caused by foliation or scaling phenomena.

Knowing the characteristics and conformation of the reservoir and its fractures is useful for appropriately managing the exploration activities and/or optimizing the development of the field.

The presence of fractures is associated with a significant change in the fluid-dynamic properties of the reservoir due to greater permeability and/or greater porosity and/or anysotropic variations thereof. Typically, the presence of fractures can have a significant impact on rock permeability, because it promotes the mutual connection of the porous structures of the rock. The fluid contained in the porous structures of the rocks is defined as formation fluid.

Permeability is the capability of a rock to allow the flow of a fluid. It is usually measured in darcy (or its submultiple millidarcy).

The permeability of a fracture (i.e., the rock in which the fracture has formed) can affect the hydrocarbon flow. Therefore, the determination of the permeability of a fracture becomes important for appropriately managing the field.

Nowadays, two methods are essentially known for determining the permeability of a fracture.

According to a first method, a coring operation is carried out, i.e., a substantially cylindrical rock sample is extracted from the reservoir, which is then analyzed above ground. The most important drawbacks of this technique are due to the fact that its implementation requires stopping the drilling operations, using the drilling system for coring operations, and providing (buying or renting) the instruments and the related services necessary for sample extraction. Therefore, such coring operations require direct costs for carrying out such operations as well as indirect costs associated with the intrinsic cost of the drilling system throughout the duration of the operations. The Applicant also observed that taking a sample to be analyzed necessarily involves upsetting the system that needs to be measured, thus making the measurement intrinsically inaccurate and unreliable.

According to a second method, well bottom data are acquired by means of dedicated instruments (e.g., using gamma rays, resistivity readings, etc.) for measuring the characteristics of the rock in that region (the so-called "bottom well log"). Also in this case, there are inevitable problems related to operational risks and costs associated with system downtime and with the need for adequate instruments.

Scientific paper "Evaluation of a Fractured Tight Reservoir in Real-Time: The Importance of Detecting Open Fractures while Drilling with Accurate Mud Flow Measurement", Search and Discovery Article #41632 (2015), discloses a method for detecting fractures and intervals of high permeability within a tight, fractured reservoir via the identification and interpretation of mud micro-losses. The detection is based on a specific system for mud flow measurement while drilling. The method provides four possible outputs, namely: (1) Natural Open Fracture, (2) Induced Fracture, (3) Micro-Fractures Matrix Permeability and (4) Mud Losses. The method does not provide, as output, an estimation of the permeability of a fracture.

Scientific paper "ESTIMATING NATURAL-FRACTURE PERMEABILITY FROM MUD-LOSS DATA", PROCEEDINGS, Thirty-Eighth Workshop on Geothermal Reservoir Engineering Stanford University, Stanford, Calif., Feb. 11-13, 2013, SGP-TR-198, discloses a method for estimating the permeability of fractures based on an artificial neural network approach. Such method is not suitable for applications based on iterative calculation techniques. In fact, should the result provided by the neural network be supplied as input to the same neural network, as in an iterative process, the output would be always the same and no improvements in the precision/reliability of the estimation would be obtained.

SUMMARY OF THE INVENTION

It is therefore one object of the present invention to provide a technique for determining the permeability of a fractured zone in the subsoil, in particular in a hydrocarbon reservoir, which can be implemented in a simple and economical manner.

It is another object of the invention to provide a technique for determining the permeability of a fractured zone in the subsoil, in particular in a hydrocarbon reservoir, which is reliable and which can be carried out without interrupting the drilling activity.

These and other objects are substantially achieved through a method and an apparatus as described in the appended claims.

BRIEF DESCRIPTION OF THE DRAWINGS

Further features and advantages will become more apparent from the following detailed description of some preferred but non-limiting embodiments of the invention.

This description will refer to the annexed drawings, which are also provided merely as explanatory and non-limiting examples, wherein.

DETAILED DESCRIPTION OF THE PREFERRED EMBODIMENTS

Figure 1:
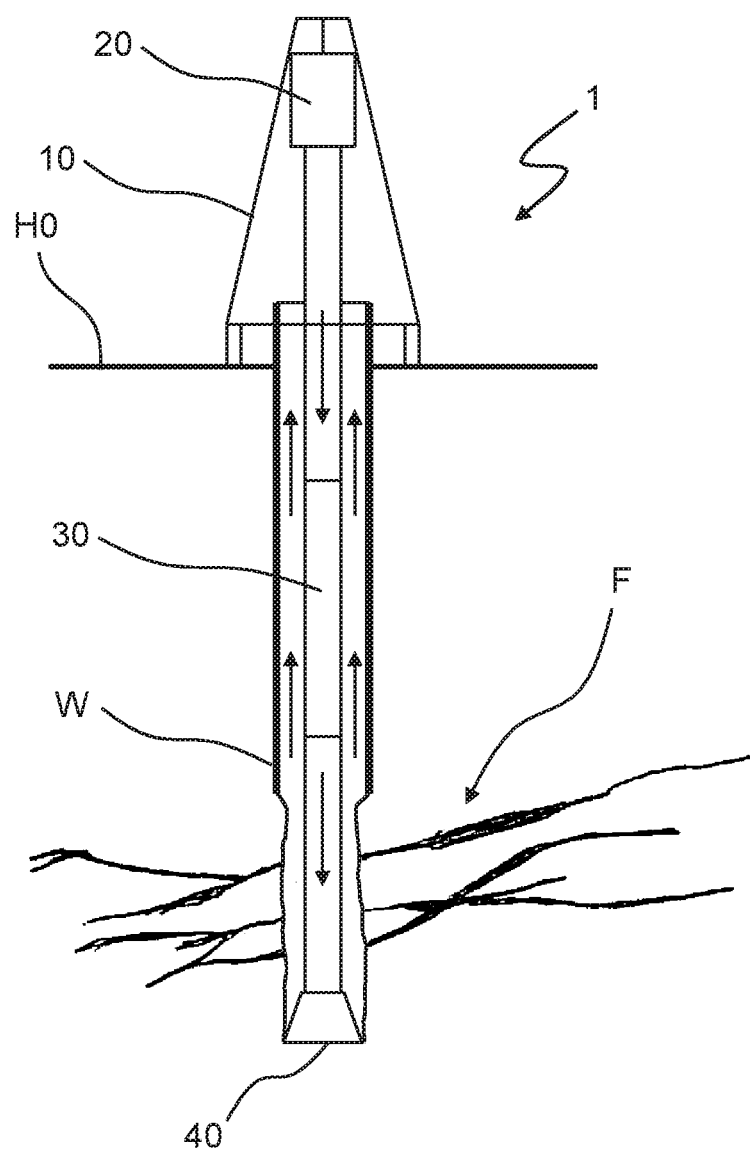
FIG. 1 shows a system wherein the invention can be implemented.

The method according to the present invention is used in the field of drilling and developing wells for hydrocarbon extraction.

In particular, the method is used when at least one well W is made in order to gain access to the hydrocarbons that are present in a reservoir.

In the present description and in the appended claims, "fracture" refers to a crevice or break in the rock that constitutes the field, which has not been caused by foliation or scaling phenomena.

In the present description and in the appended claims, a "fractured zone" is meant to be a portion of rocky formation in which there is at least one fracture, i.e., either a fracture or a system of fractures.

The well W is drilled by means of a system 1 of a known type (FIG. 1), comprising a support structure 10 and a motor 20 mounted on said support structure. In particular, the motor 20 may be constrained to the support structure 10 by means of a hook that allows it to translate along a substantially vertical axis. The rotary motion generated by the motor 20 is transferred to a drilling bit 40 through a pipe structure 30. The pipes 30 consist of tubular sections with threaded ends which, when assembled according to a predefined longitudinal development, allow the drilling bit 40 to reach depths of a few thousands of metres, while turning about their own longitudinal axis.

The assembly consisting of the pipes 30 and the drilling bit 40 will be referred to hereinafter and in the appended claims as "drilling rig".

In order to perform the drilling operation, mud is supplied to the drilling rig and reaches the drilling bit 40, since it is pumped within said pipes 30. The mud, after having reached the terminal part of the drilling bit 40 at a certain pressure, goes back up through the well W, returning to the top opening located at the support structure 10.

In FIG. 1, the downward arrows on the pipes 30 represent the mud flow supplied to the drilling bit 40, while the upward arrows outside the pipes represent the mud flow returning to the surface.

Note that FIG. 1 represents the above-described elements in a schematic manner, without necessarily observing the actual proportions between the dimensions of such elements.

First of all, the method according to the invention includes a step of detecting at least one value DFm of a characteristic quantity DF dependent on the operations associated with the drilling operations of the well W.

Said characteristic quantity DF is advantageously representative of a flow-rate difference between a mud flow being supplied to the drilling rig 30, 40 and a mud flow returning from the well W.

Figure 2:
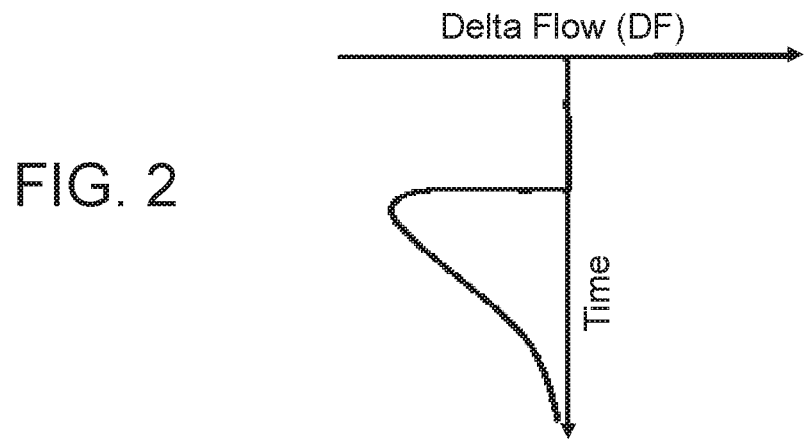
FIG. 2 shows a graph representative of a transient of the quantity used in the present invention.

This quantity is known in the literature as "delta flow" and, in the presence of a fractured zone, takes a trend like the one schematically shown in FIG. 2. The axis of abscissas shows the difference between the flow-rate of the mud supplied to the system and the flow-rate of the mud returning to the surface; the axis of ordinates shows the time.

The whole system can be considered, in first approximation, as a closed system; therefore, substantially all the mud supplied through the drilling bit then returns to the surface. In these conditions, the mud pressure is substantially balanced with the pressure of the formation fluid. This implies a "delta flow" substantially equal to zero.

During the drilling activity, when the well W encounters a fractured zone F, mud continues to arrive at the drilling bit 40 at substantially the same flow-rate (since it flows within the pipes, it is not affected by the presence of the fractured zone), without however returning completely to the surface, because part of the mud will flow into the fractured zone F instead of remaining inside the well W. In such a circumstance, therefore, the "delta flow" has values markedly different from zero, changing over time, for example, according to the transient represented in FIG. 2. According to such transient, it is possible to discern between a first phase and a second phase. In the first phase, the system is perturbed, i.e., an amount of mud does not return to the surface because of a combination of factors, including, for example, the higher pressure of the mud compared with the pressure of the formation fluid, the effect of the velocity of the mud exiting the drilling bit 40, etc. In the second phase, the system tends to re-balance, i.e., the delta flow tends towards values close to zero, e.g., because of the re-balancing of the pressures of the mud and of the formation fluid.

The flow-rate difference values can be detected/measured by using any known method, provided that it is suitable for determining this quantity.

The method according to the invention then involves using a mathematical model MM descriptive of said characteristic quantity DF and dependent on at least the permeability of the fractured zone.

More in detail, said mathematical model MM expresses a relationship between the "delta flow" and the permeability of the fractured zone.

Preferably, said mathematical model MM takes into account also other input parameters IP, which for clarity's sake are grouped herein into three main families: drilling parameters P1, system parameters P2, and circulation parameters P3 (the latter are known in the literature as "lagged parameters").

The drilling parameters P1 are typically acquired in real time by a data acquisition system and may include, without being limited to, one or more of the following:

Hook Height (HH), i.e., the position of the hook relative to the drill floor HO (i.e., the surface on which the support surface 10 is mounted, and from which the well W extends), and the quantities that can be derived therefrom, such as:

Rate of Penetration (ROP), i.e., the variation of the hook height over time, corresponding to the forward speed of the drilling bit 40 during the drilling operation;

Weight on Hook (WOH), i.e., the total downward force exerted on the hook that keeps the motor 20 and the drilling rig 30, 40 constrained to the support structure 10;

Weight on Bit (WOB), the total vertical force, directed downwards, exerted by the tip of the drilling bit 40 during the drilling operation;

Standpipe Pressure (SPP), i.e., the pressure of the mud supplied to the drilling rig;

Revolutions per Minute (RPM), i.e., the revolution speed of the drilling bit 40 about its own vertical axis, expressed in revolutions per minute;

Torque (TQ), i.e., the torque applied to the drilling bit 40 in order to cause it to rotate.

The system parameters P2 may comprise any parameter that can be used for describing the circulation system, i.e., the characteristics of the mud and its fluid-dynamic conditions as it circulates from the surface to the drilling bit 40 and then back to the surface. Therefore they may include, without being limited to, one or more of the following:

Mud Weight (MW), i.e., the specific weight of the mud being used during the drilling operation;

Rheology Parameters (RP), i.e., parameters describing the rheologic characteristics representative of the fluid and its fluid-dynamic behaviour, such as, for example, viscosity.

The circulation parameters P3 refer to data that can be acquired only with a certain delay, due to the time necessary for circulating the mud and the excavation material suspended therein from the well bottom to the surface. Therefore, the circulation parameters P3 may include, without being limited to, one or more of the following:

Total Gas (TG), i.e., the amount of gas which is dissolved in the mud during the circulation from the well bottom to the surface, and which is then released and measured by suitable equipment;

Gas Chromatography (GS—e.g., C1, C2, etc.), i.e., the fractions of hydrocarbon gases contained in the gas released on the surface after having circulated through the well bottom;

XRF data, i.e., the chemical composition of the excavation material recovered above ground and transported by the mud during the drilling operation;

XRD data, i.e., the determination of the crystalline phases constituting the excavation material, and the quantitative fractions thereof.

The values of the input parameters IP are detected/measured and inputted to the mathematical model MM to obtain a parametric dependence of the characteristic quantity DF on the permeability of the fractured zone.

Figure 3:
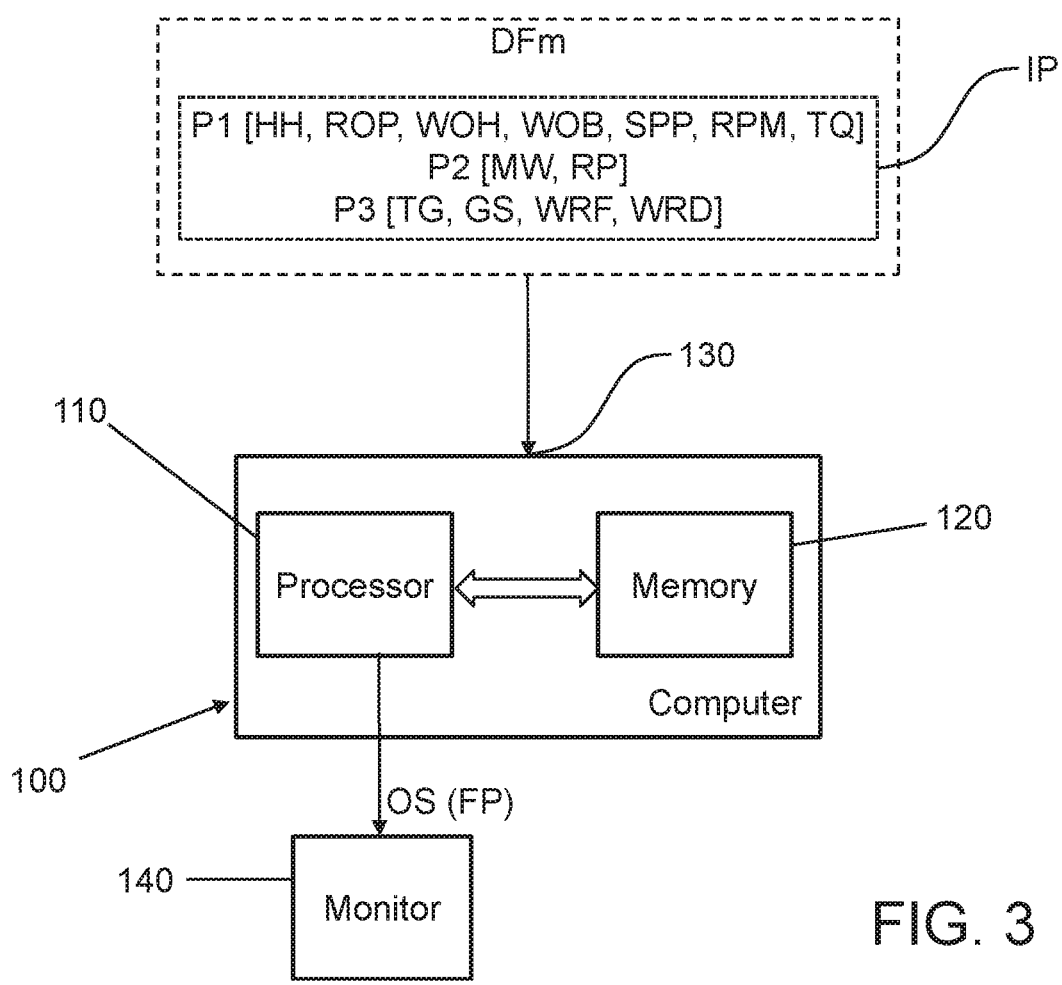
FIG. 3 shows a block diagram of an apparatus in accordance with the invention.

Advantageously, the mathematical model MM is stored in the memory 110 of an apparatus or computer 100, used for implementing the method of the invention and schematically shown in FIG. 3.

The mathematical model MM can be based on, or obtained from, for example, the following equations:

$$\eta^* = \frac{\eta}{r_w^2 \beta}$$

$$\frac{1}{r_D} \frac{\partial}{\partial r_D}\left(r_D \frac{\partial p_D}{\partial r_D}\right) = \frac{1}{\eta^*} \frac{\partial p_D}{\partial t_D}$$

$$\beta = \left(\frac{w}{r_w}\right)^2 \left(\frac{\Delta p_\Delta}{3\mu_p}\right)$$

where:

η is the diffusivity of the pressure in a mass of formation fluid in the fractured zone;

η* is the ratio of relative diffusivity of the formation fluid in the fractured zone (adimensional parameter);

rw is the radius of the well W;

β is a time factor;

rD is the adimensional radius;

pD is the adimensional pressure;

w is the hydraulic width of the fracture;

Δp∆ is the drilling overpressure;

μp is the plastic viscosity of the drilling mud.

The hydraulic width w of the fracture is then correlated with the permeability of the fracture itself.

Note that, wherever a dimensional quantities have been indicated, this is an analytic operation useful for disconnecting the mathematical model from the absolute quantities of the well, so that the model itself can be applied to wells having different dimensions or subject to different forces.

The method according to the invention also provides for executing, by means of a processor 120, the following operations:

at least one calculated value DFc of the characteristic quantity DF ("delta flow") is obtained through the mathematical model MM;

said at least one calculated value DFc is compared with the detected value DFm;

as a function of said comparison, a permeability value (FP) of said fractured region (F) is calculated;

an output signal OS representative of said permeability value FP is then generated.

In order to obtain the calculated value DFc of the characteristic quantity DF, one may also use detected/measured values of said input parameters IP, i.e., the quantities considered in the mathematical model MM, other than the permeability of the fractured zone and the mud flow-rate difference. As regards the permeability of the fractured zone, an initial value FP1 may be used as a reference, which, as will become apparent below, is then progressively corrected.

Thus, by using the initial value FP1 of the permeability of the fractured zone and the detected/calculated values of the input parameters IP, a value DFc (called "calculated value") of the characteristic quantity DF is calculated by means of the mathematical model MM.

The calculated value DFc of the characteristic quantity DF is then compared with the detected value DFm, i.e., the "real" one, determined by measuring the mud flows.

As a function of the difference between the calculated value DFc and the detected value DFm, the value of the permeability FP of the fractured zone is determined.

More in detail, the difference between such values is used for correcting the above-mentioned initial value FP1 of the permeability of the fractured zone.

The corrected value FP2 is then entered again into the mathematical model MM, preferably leaving the other parameters unchanged. A new calculated value DFc for the characteristic quantity DF is thus obtained. The new value is compared with the detected value DFm and, as a function of this comparison, the permeability value can be further corrected.

In brief, a progressive and iterative correction of the value of the permeability FP of the fractured zone is made until the difference between the calculated value DFc of the characteristic quantity DF and the detected value DFm of the same quantity falls below a predefined threshold.

When the calculated value DFc of the characteristic quantity DF is sufficiently close to the detected value DFm, it means that the permeability value entered into the mathematical model MM is substantially the real one.

Figure 4:
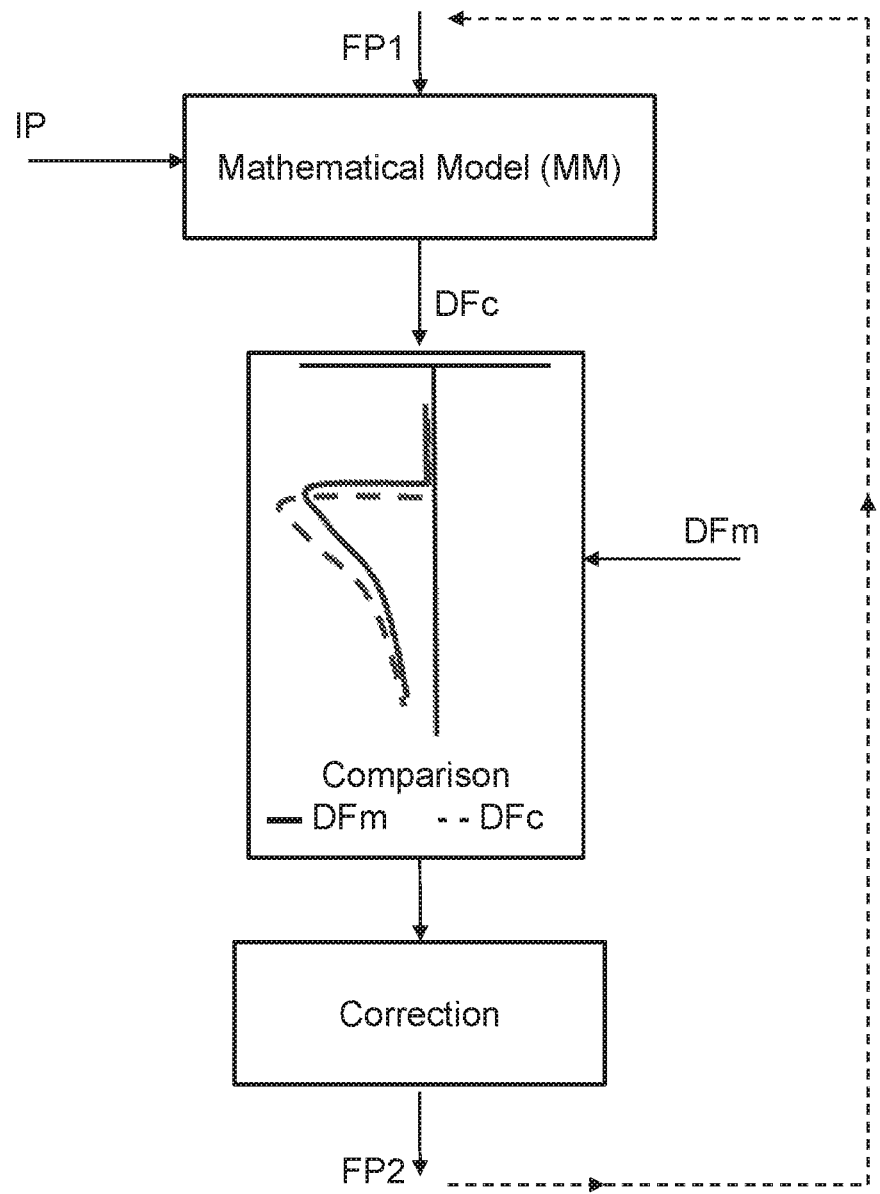
FIG. 4 shows a functional diagram representative of a method in accordance with the invention.

FIG. 4 schematically represents the processing that is carried out within the scope of the invention, starting from the initial value FP1 of the permeability of the fractured zone; by using the mathematical model MM, to which also the input parameters IP are supplied, the calculated value DFc of the characteristic quantity DF is calculated; by comparing the calculated value ("Comparison") DFc with the detected (measured) value DFm, a value X is obtained for the correction ("Correction") of the permeability value, thus arriving at the corrected value FP2. The latter is then entered again into the mathematical model MM, so as to carry out the above-described iterative and progressive correction.

As aforesaid, the method according to the invention can be implemented by means of an apparatus 100 equipped with the memory 110 and the processor 120.

The processor 120 receives, through an interface 130, the detected value DFm of the characteristic quantity DF. Through said interface 130, the processor 120 can also receive the input parameters IP. Note that the interface 130 may be a hardware connection to other devices capable of providing the above-mentioned data and/or a logic connection to software modules suitable for computing and/or pre-processing the data of interest.

The processor 120 then retrieves the mathematical model MM from the memory 110 and carries out the above-described method.

The output signal OS generated by the processor 120 may be, for example, in the form of an electronic file stored in the memory 110 and/or another storage area; in addition or as an alternative, the output signal OS may cause the permeability value FP obtained by means of the above-described processing to be displayed on a monitor 140.

The invention achieves important advantages.

First of all, the determination of the permeability of a fractured zone according to the present invention can be carried out in a simple and economical manner, since it is based on a non-invasive technique that does not require any ad hoc instruments and is essentially based on parameters that are normally monitored during the drilling operations.

Furthermore, the implementation of the invention does not require stopping the system for detecting the quantities to be measured.

What is claimed is:

1. A method for estimating an actual permeability of a fractured zone in a subsoil, wherein at least one well is being drilled by means of a drilling rig system and said fractured zone is encountered, said method being performed without interrupting drilling operations of the drilling rig system such that improved permeability information is obtained without sacrificing an efficiency of the drilling operations, the improved permeability information thereby facilitating improved hydrocarbon exploration and field optimization, said method comprising:
   a) measuring a value of a characteristic quantity associated with said well, wherein measuring the value is performed without interrupting the drilling operations of the drilling rig system;
   b) using a data acquisition system to acquire, in real time and while the drilling operations are occurring, input parameters that include one or more of a hook height parameter, a rate of penetration parameter, a weight on hook parameter, a weight on bit parameter, a standpipe pressure parameter, a revolutions per minute parameter, or a torque parameter, and wherein the input parameters further include a rheology parameter describing rheologic characteristics representative of the characteristic quantity and a mud weight parameter detailing a specific weight of mud that is used during the drilling operations;
   c) selecting an initial estimate value that is an estimate of an actual permeability of the fractured zone;
   d) retrieving, from a memory, a mathematical model descriptive of said characteristic quantity, wherein the mathematical model is configured to receive input and to compute, based on the input, a calculated value of the characteristic quantity of the well;
   e) activating a processor for:
      i. during a first execution of the mathematical model, providing the initial estimate value as a part of the input to the mathematical model, wherein the input to the mathematical model further includes the input parameters;
      ii. as a result of executing the mathematical model using the input, obtaining the calculated value of said characteristic quantity;
      iii. comparing said calculated value with said measured value;
      iv. in case a difference between said calculated value and said measured value is smaller than a determined threshold, generating an output signal that is based on the input;
      v. in case the difference between said calculated value and said measured value is greater than said determined threshold:
         1. selecting a further estimate value that is another estimate of the actual permeability of said fractured zone, wherein the further estimate value is calculated based on a function of said difference and of said initial estimate value;
         2. during a subsequent execution of the mathematical model, providing both the further estimate value and the previously acquired input parameters as the input to the mathematical model, wherein the previously acquired input parameters are used for the subsequent execution despite updated input parameters being available as a result of the data acquisition system operating in real time; and
         3. repeating steps ii to iv to generate the output signal or, alternatively, repeating steps ii to v until the output signal is generated;
      wherein the output signal, which is representative of the actual permeability of the fractured zone, is indicative of whether the well is to be further explored for hydrocarbon extraction.

2. The method according to claim 1, wherein the fractured zone is located in a hydrocarbon reservoir.

3. The method according to claim 1, wherein the input parameters include all of the following parameters: the hook height parameter; the rate of penetration parameter; the weight on hook parameter; the weight on bit parameter; the standpipe pressure parameter; the revolutions per minute parameter; and the torque parameter.

4. The method according to claim 3, wherein values of said input parameters are detected and inputted to said mathematical model in order to obtain a parametric dependence of said characteristic quantity on the estimate of the actual permeability of said fractured zone.

5. The method according to claim 1, wherein the estimate of the actual permeability of said fractured zone is correlated to a hydraulic width of a fracture or system of fractures included in said fractured zone.

6. The method of claim 1, wherein the input parameters include the hook height parameter.

7. The method of claim 1, wherein the input parameters include the rate of penetration parameter.

8. The method of claim 1, wherein the input parameters include the weight on hook parameter.

9. The method of claim 1, wherein the input parameters include the weight on bit parameter.

10. The method of claim 1, wherein the input parameters include the standpipe pressure parameter.

11. The method of claim 1, wherein the input parameters include the revolutions per minute parameter.

12. The method of claim 1, wherein the input parameters include the torque parameter.

13. An apparatus for estimating an actual permeability of a fractured zone in a subsoil, wherein at least one well is being drilled by means of a drilling rig system and said fractured region is encountered, determining the permeability of the fractured zone is performed without interrupting drilling operations of the drilling rig system such that improved permeability information is obtained without sacrificing an efficiency of the drilling operations, the improved permeability information thereby facilitating improved hydrocarbon exploration and field optimization, and wherein said apparatus comprises:

a) an interface for receiving at least one measured value of a characteristic quantity of said well, wherein measuring the value is performed without interrupting the drilling operations of the drilling rig system;

b) a data acquisition system configured to acquire, in real time and while the drilling operations are occurring, input parameters that include one or more of a hook height parameter, a rate of penetration parameter, a weight on hook parameter, a weight on bit parameter, a standpipe pressure parameter, a revolutions per minute parameter, or a torque parameter, and wherein the input parameters further include a rheology parameter describing rheologic characteristics representative of the characteristic quantity and a mud weight parameter detailing a specific weight of mud that is used during the drilling operations;

c) a memory storing a mathematical model descriptive of said characteristic quantity, wherein the mathematical model is configured to receive input and to compute, based on the input, a calculated value of the characteristic quantity of the well;

d) a processor configured for:
  i. selecting an initial estimate value that is an estimate of an actual permeability of the fractured zone;
  ii. during a first execution of the mathematical model, providing the initial estimate value as a part of the input to the mathematical model, wherein the input to the mathematical model further includes the input parameters;
  iii. as a result of executing the mathematical model using the input, obtaining the calculated value of said characteristic quantity;
  iv. comparing said calculated value with said measured value;
  v. calculating an estimate of the actual permeability of said fractured zone as a function of said comparison; and
  vi generating an output signal representative of said estimate of the actual permeability, wherein the output signal is indicative of whether the well is to be further explored for hydrocarbon extraction.

* * * * *